(12) United States Patent
Wessner et al.

(10) Patent No.: US 7,369,808 B2
(45) Date of Patent: May 6, 2008

(54) INSTRUCTIONAL ARCHITECTURE FOR COLLABORATIVE E-LEARNING

(75) Inventors: Martin Wessner, Moerlenbach (DE);
Wolfgang Theilmann, Karlsruhe (DE);
Michael Altenhofen, Karlsruhe (DE);
Wolfgang Gerteis, Karlsruhe (DE);
Torsten Leidig, Karlsruhe (DE)

(73) Assignee: Sap Aktiengesellschaft, Walldorf (DE)

( * ) Notice: Subject to any disclaimer, the term of this patent is extended or adjusted under 35 U.S.C. 154(b) by 0 days.

(21) Appl. No.: 10/359,290

(22) Filed: Feb. 6, 2003

(65) Prior Publication Data

US 2003/0194690 A1    Oct. 16, 2003

Related U.S. Application Data

(60) Provisional application No. 60/354,325, filed on Feb. 7, 2002.

(51) Int. Cl.
*G00B 3/00* (2006.01)
(52) U.S. Cl. ................. 434/350; 434/118; 434/362
(58) Field of Classification Search ............... 434/118, 434/362, 350
See application file for complete search history.

(56) References Cited

U.S. PATENT DOCUMENTS

| | | | |
|---|---|---|---|
| 5,008,853 | A | 4/1991 | Bly et al. |
| 5,299,287 | A | 3/1994 | Tsuruta et al. |
| 5,310,349 | A | 5/1994 | Daniels et al. |
| 5,395,243 | A | 3/1995 | Lubin et al. |
| 5,584,699 | A | 12/1996 | Silver |
| 5,675,802 | A | 10/1997 | Allen et al. |
| 5,692,125 | A | 11/1997 | Schloss et al. |
| 5,727,950 | A | 3/1998 | Cook et al. |
| 5,727,951 | A | 3/1998 | Ho et al. |
| 5,788,508 | A | 8/1998 | Lee et al. |
| 5,802,514 | A | 9/1998 | Huber |

(Continued)

FOREIGN PATENT DOCUMENTS

GB    2373625 A    9/2002

(Continued)

OTHER PUBLICATIONS

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

(Continued)

*Primary Examiner*—Scott Jones
(74) *Attorney, Agent, or Firm*—Fish & Richardson P.C.

(57) ABSTRACT

A learning system, method, and data structure provides collaborative activities between learners. The system includes an interface to receive a learning strategy selected by a learner. A content management system stores content and one or more collaboration elements associated with a course. A learning management system determines the learning content and the one or more collaboration elements to present to the learner based on the selected learning strategy. The learner participates using the collaboration element at a time of the learner's choosing while taking the course. The collaboration activity may be based on one or more collaboration scenarios including a brainstorming activity, a cooperative text processing activity, an explanation discourse activity, an answer-to-tutor activity, and a pro-contra dispute. The collaboration element may be provided as an intentional point of collaboration.

22 Claims, 8 Drawing Sheets

U.S. PATENT DOCUMENTS

| | | | |
|---|---|---|---|
| 5,881,315 | A | 3/1999 | Cohen |
| 6,011,949 | A | 1/2000 | Shimomukai |
| 6,014,134 | A | 1/2000 | Bell et al. |
| 6,029,043 | A | 2/2000 | Ho et al. |
| 6,091,930 | A | 7/2000 | Mortimer et al. |
| 6,099,320 | A | 8/2000 | Papadopoulos |
| 6,112,049 | A | 8/2000 | Sonnenfeld |
| 6,134,552 | A | 10/2000 | Fritz et al. |
| 6,148,338 | A | 11/2000 | Lachelt et al. |
| 6,149,438 | A | 11/2000 | Richard et al. |
| 6,149,441 | A * | 11/2000 | Pellegrino et al. ......... 434/350 |
| 6,162,060 | A | 12/2000 | Richard et al. |
| 6,164,974 | A | 12/2000 | Carlile et al. |
| 6,175,841 | B1 | 1/2001 | Loiacono |
| 6,285,993 | B1 | 9/2001 | Ferrell |
| 6,315,572 | B1 | 11/2001 | Owens et al. |
| 6,325,632 | B1 | 12/2001 | Chao et al. |
| 6,336,813 | B1 | 1/2002 | Siefert |
| 6,341,960 | B1 | 1/2002 | Frasson et al. |
| 6,347,333 | B2 | 2/2002 | Eisendrath et al. |
| 6,347,943 | B1 | 2/2002 | Fields et al. |
| 6,368,110 | B1 | 4/2002 | Koenecke et al. |
| 6,370,355 | B1 | 4/2002 | Ceretta et al. |
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,405,236 | B1 | 6/2002 | Nieratschker |
| 6,430,563 | B1 | 8/2002 | Fritz et al. |
| 6,470,171 | B1 * | 10/2002 | Helmick et al. ......... 434/362 |
| 6,471,521 | B1 * | 10/2002 | Dornbush et al. ......... 434/322 |
| 6,514,085 | B2 | 2/2003 | Slattery et al. |
| 6,527,556 | B1 | 3/2003 | Koskinen |
| 6,587,668 | B1 | 7/2003 | Miller et al. |
| 6,606,479 | B2 | 8/2003 | Cook et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B2 | 11/2003 | Kilgore |
| RE38,432 | E | 2/2004 | Fai et al. |
| 6,685,478 | B2 | 2/2004 | Ho et al. |
| 6,701,125 | B1 * | 3/2004 | Lohse ......... 434/350 |
| 6,709,330 | B1 | 3/2004 | Klein et al. |
| 6,729,885 | B2 | 5/2004 | Stuppy et al. |
| 6,801,751 | B1 | 10/2004 | Wood et al. |
| 6,877,107 | B2 | 4/2005 | Giotta et al. |
| 6,988,138 | B1 | 1/2006 | Alcorn et al. |
| 7,010,002 | B2 | 3/2006 | Chow et al. |
| 7,146,616 | B2 | 12/2006 | Dorner et al. |
| 7,149,807 | B1 | 12/2006 | Kontothanassis |
| 2001/0018178 | A1 | 8/2001 | Siefert |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1 | 5/2002 | Catten et al. |
| 2002/0073063 | A1 | 6/2002 | Faraj |
| 2002/0087496 | A1 | 7/2002 | Stripe et al. |
| 2002/0107681 | A1 | 8/2002 | Goodkovsky |
| 2002/0138841 | A1 | 9/2002 | Ward |
| 2002/0142278 | A1 | 10/2002 | Whitehurst et al. |
| 2002/0168621 | A1 | 11/2002 | Cook et al. |
| 2002/0188583 | A1 | 12/2002 | Rukavina et al. |
| 2003/0013073 | A1 | 1/2003 | Duncan et al. |
| 2003/0049593 | A1 | 3/2003 | Parmer et al. |
| 2003/0073063 | A1 | 4/2003 | Dattaray et al. |
| 2003/0073065 | A1 | 4/2003 | Riggs |
| 2003/0082508 | A1 | 5/2003 | Barney |
| 2003/0113700 | A1 | 6/2003 | Simon |
| 2003/0126136 | A1 | 7/2003 | Omoigui |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152903 | A1 | 8/2003 | Theilmann |
| 2003/0152904 | A1 | 8/2003 | Doty, Jr. |
| 2003/0152905 | A1 | 8/2003 | Altenhofen et al. |
| 2003/0152906 | A1 | 8/2003 | Krebs et al. |
| 2003/0157470 | A1 | 8/2003 | Altenhofen et al. |
| 2003/0163784 | A1 | 8/2003 | Daniel et al. |
| 2003/0175664 | A1 | 9/2003 | Frangenheim et al. |
| 2003/0175676 | A1 | 9/2003 | Theilmann et al. |
| 2003/0195946 | A1 | 10/2003 | Yang |
| 2003/0211447 | A1 | 11/2003 | Diesel et al. |
| 2003/0224339 | A1 | 12/2003 | Jain et al. |
| 2004/0081951 | A1 | 4/2004 | Vigue et al. |
| 2004/0210461 | A1 | 10/2004 | Bohle |
| 2005/0014121 | A1 | 1/2005 | Eck et al. |
| 2005/0066324 | A1 | 3/2005 | Delgado et al. |
| 2005/0079477 | A1 | 4/2005 | Diesel et al. |
| 2005/0204337 | A1 | 9/2005 | Diesel et al. |
| 2005/0216923 | A1 | 9/2005 | Krebs |
| 2006/0059253 | A1 | 3/2006 | Goodman et al. |
| 2006/0168233 | A1 | 7/2006 | Alcorn et al. |

FOREIGN PATENT DOCUMENTS

| | | |
|---|---|---|
| WO | WO 99/09490 | 2/1999 |
| WO | WO 02/21379 | 3/2002 |
| WO | WO 02/073442 A | 9/2002 |

OTHER PUBLICATIONS

Jörg Siekmann et al., "Adaptive Course Generation and Presentation," ITS Workshop on Adaptive and Intelligent Web-Based Foundation System, Montreal. The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al., "Modeling Constructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

U.S. Appl. No. 60/201,500, Adams.

U.S. Appl. No. 60/272,251, Ward.

U.S. Appl. No. 60/329,088, filed Oct. 12, 2001, Riggs.

U.S. Appl. No. 60/334,714, filed Nov. 1, 2001, Diesel.

U.S. Appl. No. 60/400,606, filed Aug. 1, 2002, Diesel.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and Corba Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Chinese Office Action for Application No. 03807172X, dated Jan. 27, 2006.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

Chang et al., "Web Browsing in a Wireless Environment: Disconnected and Asynchronous Operation in ARTour Web Express", IBM Research Center, ACM Press 1997, pp. 260-269.

* cited by examiner

INSTRUCTIONAL ARCHITECTURE FOR COLLABORATIVE E-LEARNING

This application claims priority to U.S. Provisional Application No. 60/354,325, filed Feb. 7, 2002, and titled INSTRUCTIONAL ARCHITECTURE FOR COLLABORATIVE E-LEARNING, which is hereby incorporated by reference in its entirety for all purposes.

TECHNICAL FIELD

The following description relates generally to e-learning and in particular to collaborative e-learning.

BACKGROUND

Systems and applications for delivering computer-based training (CBT) have existed for many years. However, CBT systems historically have not gained wide acceptance. A problem hindering the reception of CBTs as a means of training workers and learners is the inflexibility of courses and training material to adapt to the need of individual learners.

Some CBTs were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the course material may not be easily adapted or changed for specific training needs of different learners. As a result, the course often fails to meet the needs of the trainee and/or trainer.

In addition, CBT systems do not provide for collaborative learning that is typically associated with classes taught in a classroom. Practically all CBT courses are constructed according to the paradigm of individual learning that at best is enhanced by an environment that enables users to communicate with each other. For example, a typical web-based course may include an elaborate hyper media structure. The structure is embedded into an environment that provides general tools for communication (e.g., chat rooms or video conferencing). However, content and collaboration are not integrated.

Therefore, for the above and other reasons, new methods and technologies are needed to supplement traditional computer based training and instruction.

SUMMARY

In one general aspect, a learning system includes an interface to receive a learning strategy selected by a learner; a content management system to store content and one or more collaboration elements associated with a course; and a learning management system to determine the learning content and the one or more collaboration elements to present to the learner based on the selected learning strategy. The learner may participate using the collaboration element at a time of the learner's choosing while taking the course.

A collaboration template may be associated with the collaboration element. The collaboration template corresponds to a collaboration scenario. The collaboration scenario may include a collaboration activity between two or more learners of the learning system. The collaboration scenario may include one of a brainstorming activity, a cooperative text processing activity, an explanation discourse activity, an answer-to-tutor activity, and a pro-contra dispute.

The course may include one or more structural elements and at least one of the structural elements may include a collaboration element. In particular the structural element may be a knowledge item. The structural elements do not enforce a sequence of the content or collaboration elements that a learner uses to traverse the course.

One or more competencies may be associated with the collaboration element. The competencies may used to determine how to present course material to the learner. A collaboration property may be associated with the collaboration element. The collaboration property indicates a learner's interaction with the collaboration element. The collaboration property may be used to determine how to present collaboration elements to the learner.

The collaboration element may be an intentional point of collaboration.

In another general aspect, a method of e-learning comprises dividing content associated with an e-learning course into two or more structural elements that may be interpreted by a browser, one of the structural elements comprising a collaboration element; aggregating the structural elements into two or more levels, where a higher level may refer to any instance of a lower level; and assembling the structural elements into a course.

In another general aspect, a memory for storing course data for access by an application program being executed by a content player, includes a course data structure stored in the memory, the course data structure including information used by the application to present an e-learning course, the course data structure including a plurality of structural elements aggregated into two or more levels, where a higher level may refer to any instance of a lower level, at least one of the structural elements including a collaboration element; metadata to describe the structural elements; and a plurality of relations to indicate dependencies between the structural elements.

In another general aspect, an author station comprises an author input device to input commands; and a author tool to receive input commands and to assemble structural elements in response to the commands the author tool including an interface to present the structural elements, to select the structural elements, and to create at least one structural element that includes a collaboration element.

The author tool is configured to create the collaboration element using a collaboration template. The collaboration template corresponds to a brainstorming activity, a cooperative text processing activity, an explanation discourse activity, an answer-to-tutor activity, and a pro-contra dispute. The collaboration template is configured to provide a collaboration activity between two or more learners.

Other features and advantages will be apparent from the description, the drawings, and the claims.

DESCRIPTION OF DRAWINGS

Like reference symbols in the various drawings indicate like elements.

DETAILED DESCRIPTION

E-learning Content Structure

According to the implementations described below, an e-learning system and methodology structures content associated with a course or training so that the content is reusable and flexible. For example, the content structure allows the creator of a course to reuse existing content to create new or additional courses. In addition, the content structure provides flexible content delivery that may be adapted to the needs of different learners. In particular, course content may be dynamically assembled into a temporary course as explained in detail below. In addition, collaborative activities may be integrated in the course to enhance a learner's experience.

A course may be created from a number of learning objects associated with content that forms the course material. Each learning object may include information/data associated with the course and/or links to the data. The learning objects also may have associated metadata that may be used to describe attributes, characteristics, and/or qualities of the learning objects, in addition to relations to other learning objects. The learning objects may be organized and/or assembled to create a course (which may be presented to a learner).

Figure 1:
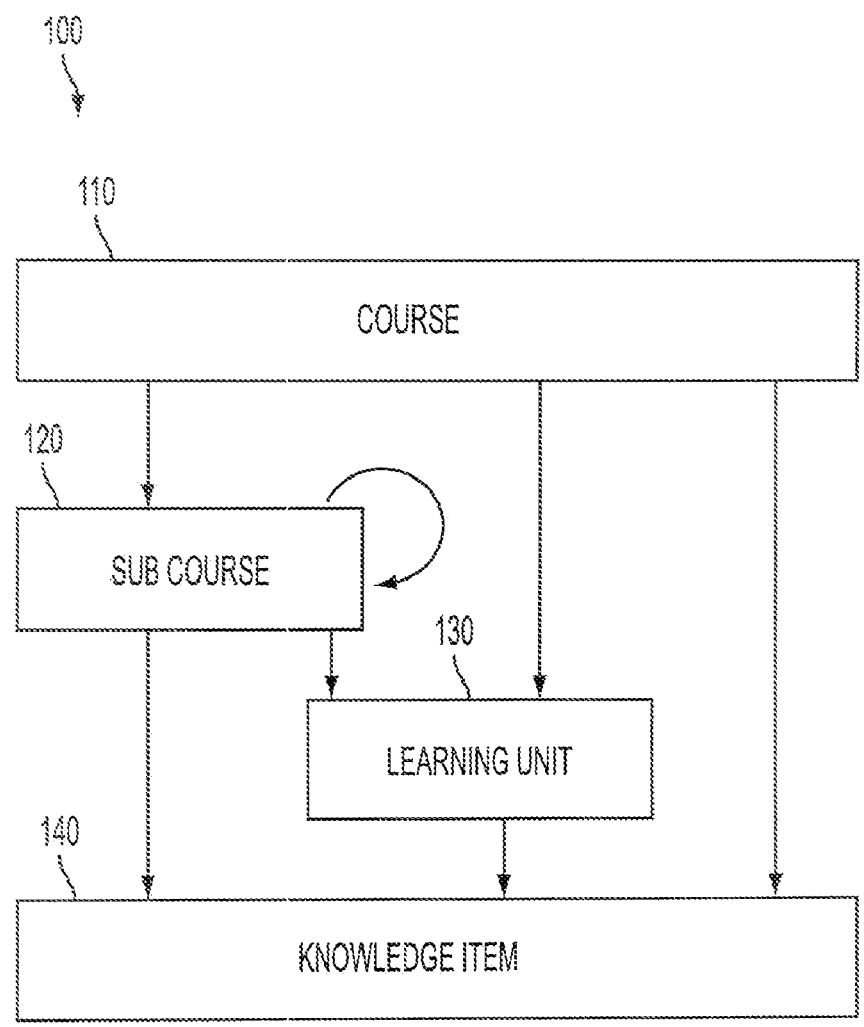
FIG. 1 is an exemplary course content aggregation model.

In one implementation, the e-learning objects may be implemented using one or more structural elements. Content associated with the course may be amassed using the structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. In addition, knowledge items may be used to implement collaboration activities. Knowledge items 140 typically are small in size (e.g., of limited duration).

A number of attributes may be used to describe a knowledge item 140, such as, for example, a name, a type of media, access rights, device capabilities, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test. An access right may be used to determine whether to give access to a learner or other individual (e.g., a course author, an instructor, and/or a tutor).

A knowledge item 140 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML®), or an extensible markup language (XML)), JAVASCRIPT® (a client-side scripting language), and/or FLASH® may be used to create knowledge items 140 and their associated data. In addition, collaborative tools, such as, chatrooms, email, instant message, audio/visual conferencing and white/black boards may be implemented using knowledge items for course collaboration activities.

HTML may be used to describe the logical elements and presentation of a document, such as, for example, text, headings, paragraphs, lists, tables, or image references.

FLASH® may be used as a file format for FLASH® movies and as a plug-in for playing FLASH® files in a browser. For example, FLASH® movies using vector and bitmap graphics, animations, transparencies, transitions, MP3 audio files, input forms, and interactions may be used. In addition, FLASH® allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. A learning unit 130 also may be considered relatively small in size (e.g., of limited duration) though larger than a knowledge item 140.

Sub-courses 120 may be assembled using other sub-courses 120, learning units 130, and/or knowledge items 140. The subcourse 120 may be used to split up an extensive course into several smaller subordinate courses. Sub-courses 120 also may be used to build an arbitrarily deep nested structure by referring to other sub-courses 120.

Courses may be assembled from all of the subordinate structural elements including sub-courses 120, learning units 130, and knowledge items 140. To foster maximum reuse and flexibility, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata also may be used to indicate learner competencies associated with the structural elements. Other metadata may include a number of knowledge types (e.g., orientation, action, explanation, and resources) that may be used to categorize structural elements.

Figure 2:
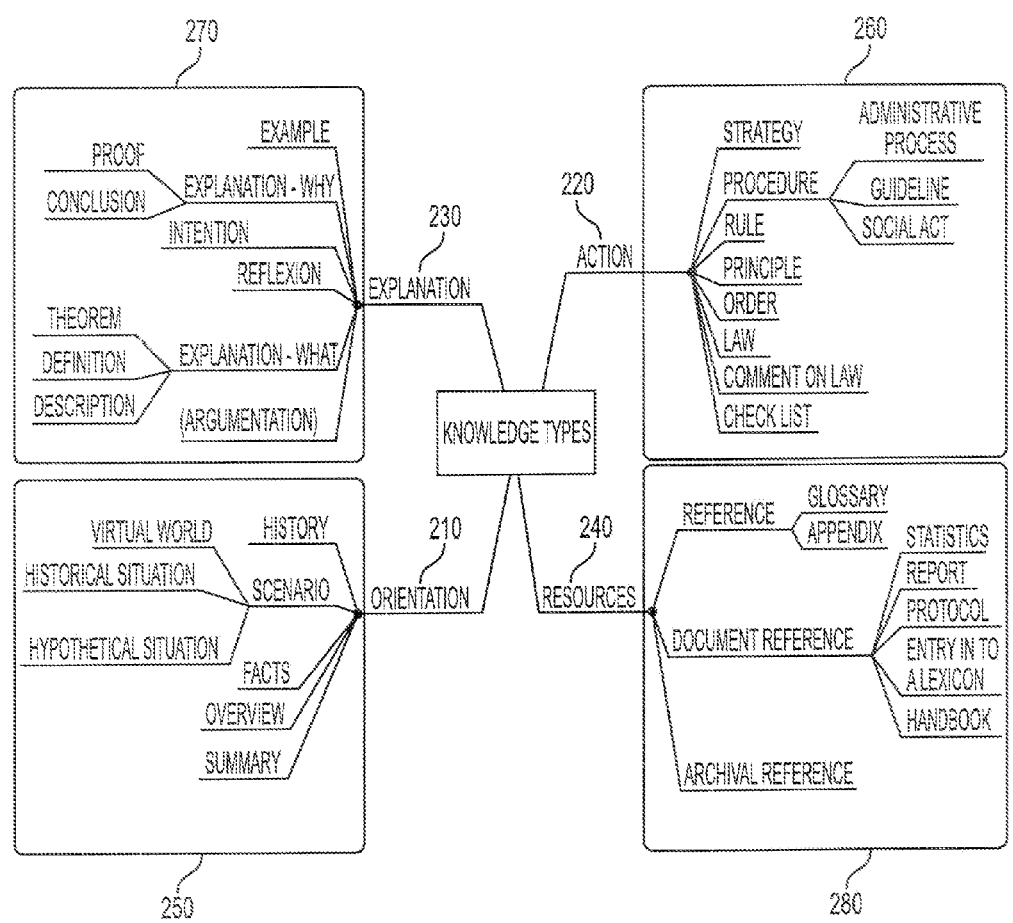
FIG. 2 is an example of an ontology of knowledge types for e-learning.

As shown in FIG. 2, structural elements may be categorized using a didactical ontology 200 of knowledge types 201 that include orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, a intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true in one direction or two directions (e.g., bi-directional). Directional relations should be followed.

Relations may be divided into two categories: subject-taxonomic and non-subject taxonomic. Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, an senso-motorical skill, or a social skill.

Course Graphs

The content structure associated with a course may be represented as a set of graphs. A structural element may be represented as a node in a graph. Node attributes are used to convey the metadata attached to the corresponding structural element (e.g., a name, a knowledge type, a competency, access rights, device type, and/or a media type). A relation between two structural elements may be represented as an edge.

Figure 3:
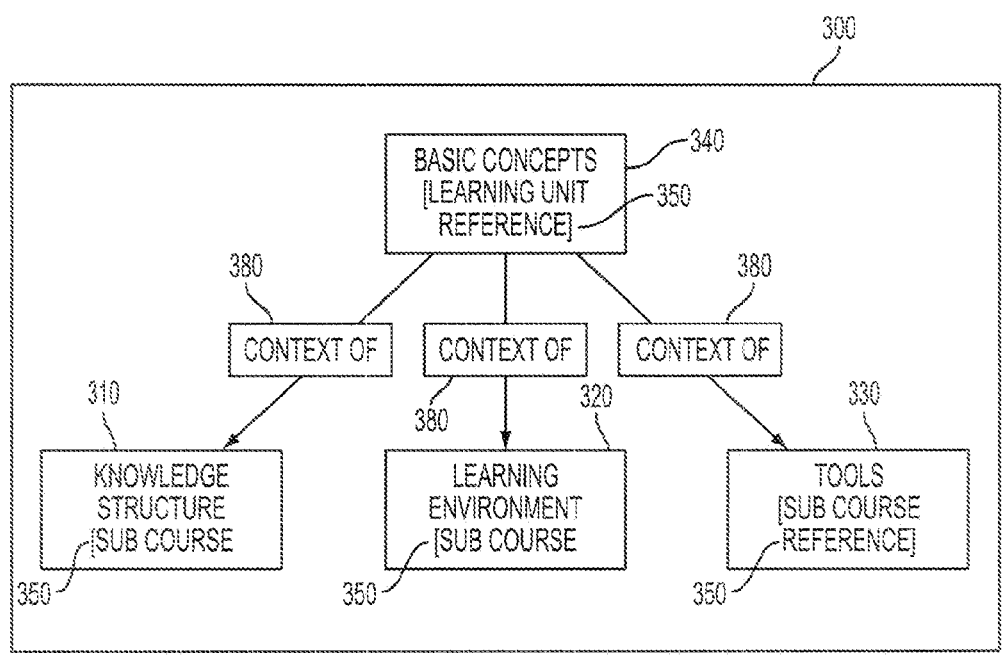
FIG. 3 is an example of a course graph for e-learning.

For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
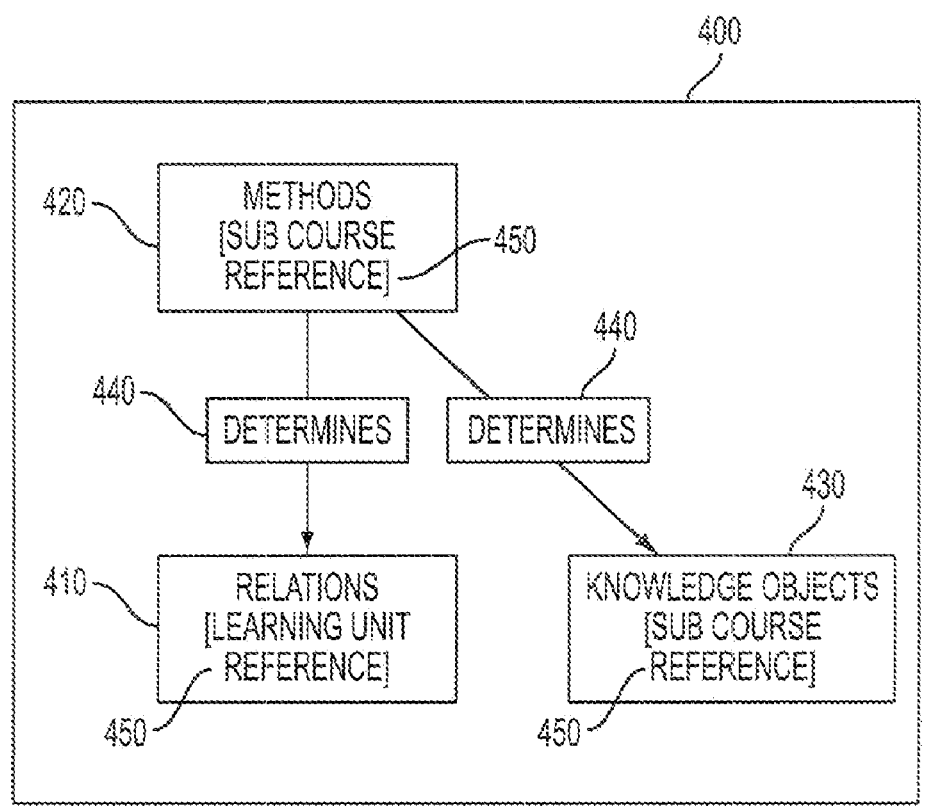
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation. "determines" has been provided between the structural elements (e.g., the sub-course "Methods" determines the sub-course "Knowledge objects" and the learning unit "Relations".) In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
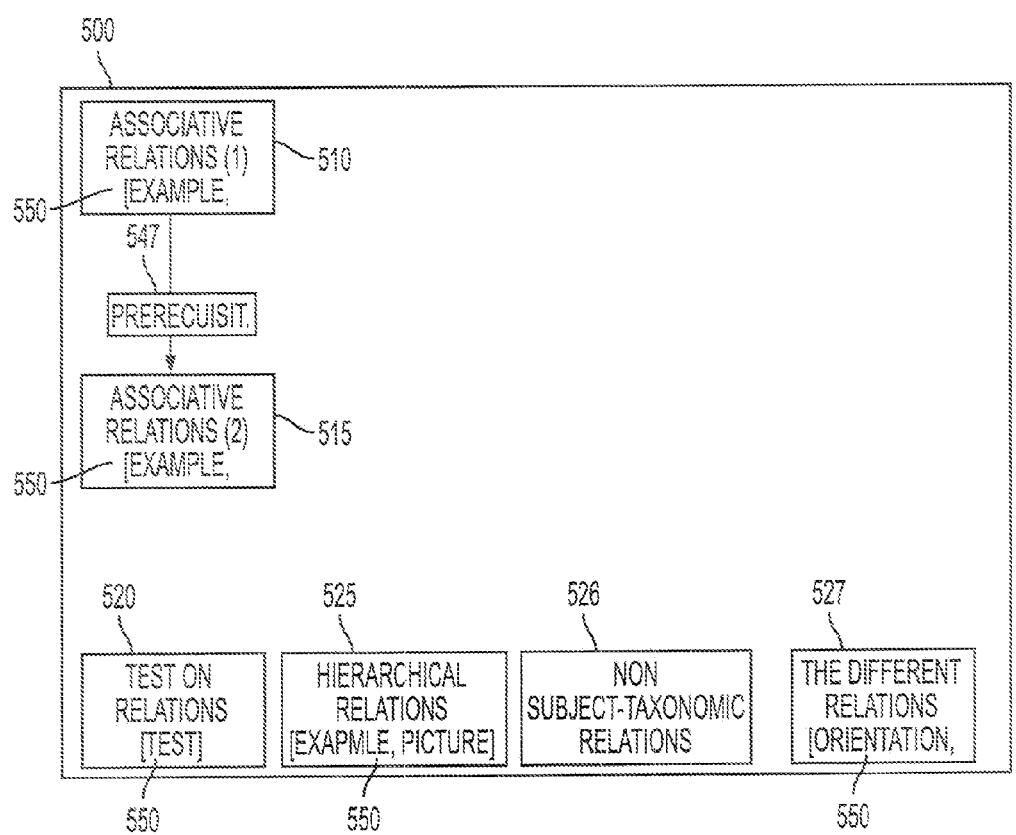
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)", "Associative relations (2)", "Test on relations", "Hierarchical relations", "Non subject-taxonomic relations", and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

E-learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course).

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation-oriented", and "table of contents").

E-learning System

Figure 6:
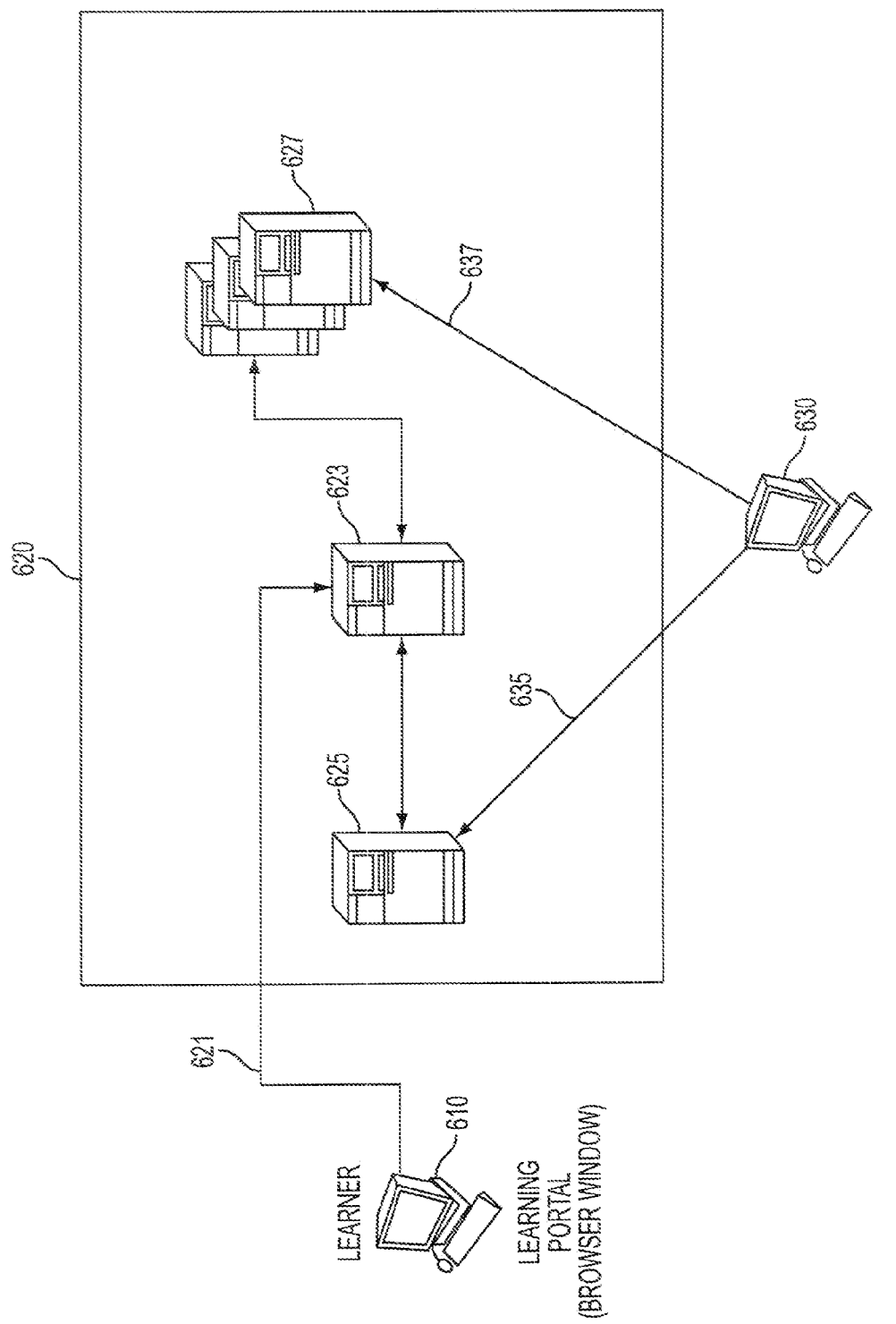
FIGS. 6 and 7 are block diagrams of exemplary e-learning systems.

As shown in FIG. 6, an e-learning architecture 600 may include a learning station 610, a learning system 620, and a course author station. The learner may access the learning system 620 and courses using the learning station 610. The learning station 610 may be implemented using a general-purpose computer capable of responding to and executing instructions in a defined manner. Examples of learning stations 610 include a special-purpose computer, a personal computer ("PC"), a workstation, a server, a laptop, a Web-enabled personal digital assistant ("PDA"), an interactive television set, a set top box, an on-board (i.e., vehicle-mounted) computer, or a combination of two or more these devices capable of responding to, generating, and/or executing instructions. The learning station 610 also may include any number of other devices, components, and/or peripherals, such as memory/storage devices, input devices, output devices, user interfaces, and/or communications interfaces.

The learning station 610 also may include one or more software applications (e.g., an operating system, a browser application, a microbrowser application, a server application, a proxy application, a gateway application, a tunneling application, and a distributed conferencing application, among others) loaded on the learning station 610 to command and direct the learning station 610. Applications may include a computer program, a piece of code, an instruction, or some combination thereof, for independently or collectively instructing the learning station 610 to interact and operate as desired.

In particular, the learning station 610 includes an application that is configured to access, interpret, and present courses and related information to a learner. For example, the learning station 610 may include a browser to implement a learning portal that allows a learner to access the learning system 620. The communications link 621 is configured to send and receive signals relating to the course and data used by the learning system 620.

The applications may be embodied permanently or temporarily in any type of machine, component, physical or virtual equipment, storage medium, or propagated signal or wave capable of providing instructions to the learning station 610. In particular, the applications may be stored on a storage medium or device (e.g., a read only memory (ROM), a random access memory (RAM), a volatile/non-volatile memory, a magnetic disk, or a propagated signal) readable by the learning station 610, such that if the storage medium or device is read by the learning station 610, the specified step or instructions are performed.

The learning station 610 also may include one or more communications interfaces that allow the client device to send and receive information using the communications path 621. The communications path 621 may be configured to send and receive signals (e.g., electrical, electromagnetic, or optical) that convey or carry data streams representing various types of analog and/or digital content. For example, the communications paths 621 may be implemented using various communications media and one or more networks comprising one or more network devices (e.g., servers, routers, switches, hubs, repeaters, and storage devices). The one or more networks may include a WAN, a LAN, a plain old telephone service (POTS) network, a digital user line (DSL) network, an integrated services digital network (ISDN), and a synchronous optical network (SONNET), or a combination of two or more of these networks. In addition, the communications paths 621 may include one or more wireless links that transmit and receive electromagnetic signals, such as, for example, radio, infrared, and microwave signals to convey information.

The learning system 620 also may include one or more network devices (e.g., servers, routers, switches, hubs, repeaters, and storage devices) and communications media configured to provide an e-learning infrastructure to learners. As shown in FIG. 6, the learning system 620 may include a learning management system 623, a content management system 625, and an administration management system 627. Each of these systems may be implemented using one or more servers, processors, and/or other network devices.

In addition, an authoring station 630 may be provided to create courses.

Figure 7:
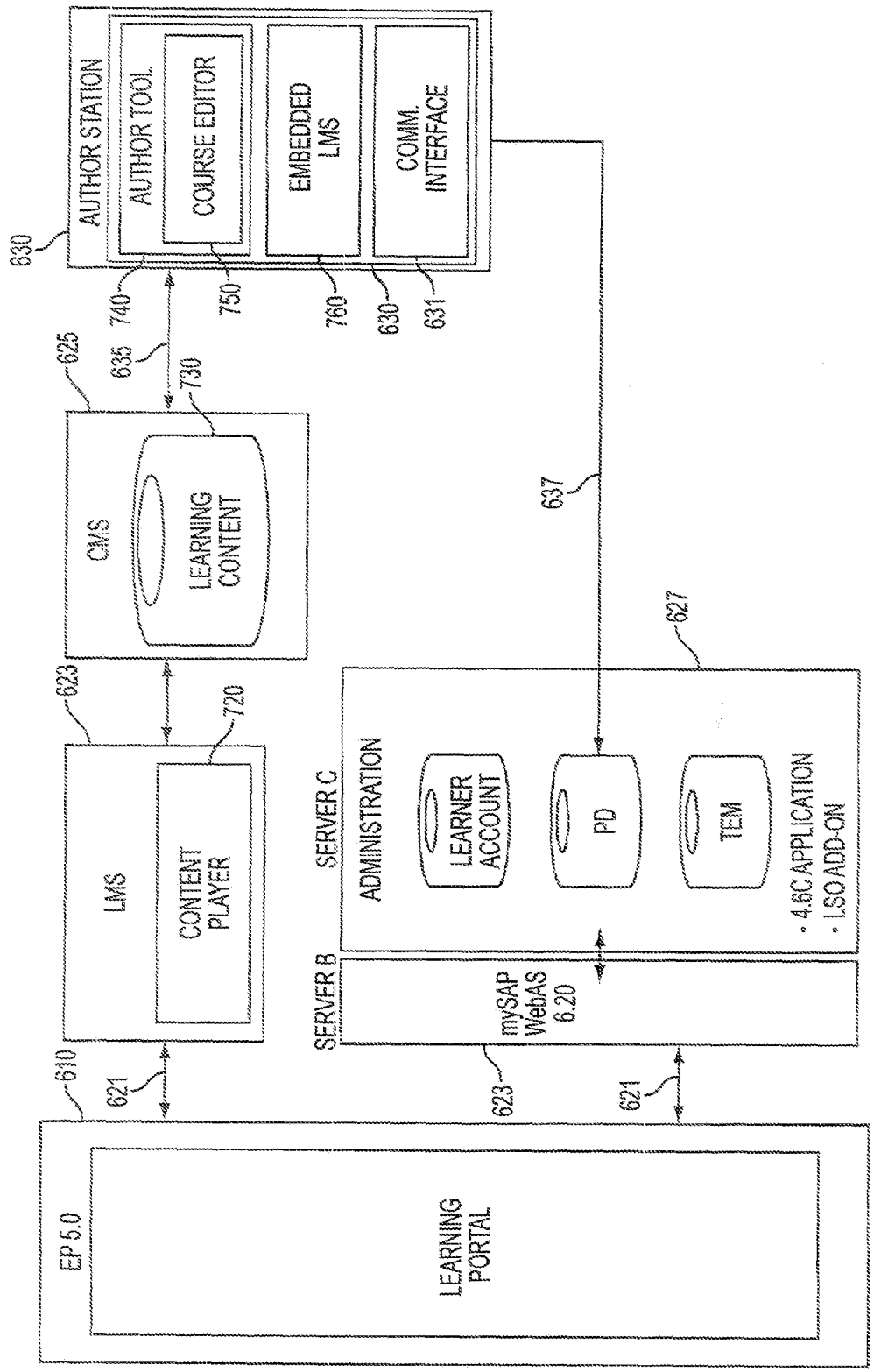

As shown in FIG. 7, the administration management system 627 may be implemented using a server, such as, for example, the SAP R/3 4.6C +LSO Add-On. The administration management system 627 includes one or more databases, including a database of learner accounts and a database of course information. The learner account may include demographic data (e.g., a name, an age, a sex, an address, a company, a school, an account number, and a bill) for a learner and his/her progress through the course material (e.g., places visited, tests completed, skills gained, knowledge acquired, properties, and competencies using the material). The administration management system 627 also may provide a database of course material including additional information about courses, such as course title, description, courses offered, a course catalog the author/instructor of a course, and the most popular courses and offer services to search and book courses.

The content management system 625 may include a learning content server 730. The learning content server 730 may be implemented using a WebDAV server. The learning content server 730 may include a content repository. The content repository stores course files and media files that are used to present a course to a learner at the learning station 610. The course files may include the structural elements that make up a course and may be stored as XML files. The media files may be used to store the content that is included in the course and assembled for presentation to the learner at the learning station 610.

The learning management system 623 may include a content player 720. The content player 720 may be implemented using a server, such as an SAP J2EE Engine. The content player 720 is used to obtain course material from the content repository. The content player 720 also applies the learning strategies to the obtained course material to generate a navigation tree or path for the learner. The navigation tree or path is used to suggest a route through the course material for the learner and to generate a presentation of course material to the learner based on the learning strategy selected by the learner.

The learning management system 623 also may include an interface for exchanging information with the administration management system 627. For example, the content player 720 may update the learner account information as the learner progresses through the course material to indicate, for example, competencies gained, tests passed, courses completed.

Learning Station

The learner may access information about a course, content associated with a course, information about the learning system 620, and information about the learner (e.g., stored in the learner account) using the learning station 610. As shown in FIG. 7, the learning station 610 may include a processor, a communications interface, and a storage device. The learning station 610 also may include any number of peripherals or integrated devices (e.g., displays, memory/storage devices, input devices, ports/interfaces, printers, communication interfaces, microphones, and speakers) that facilitate access to, presentation of, and interaction with the course, its content, and associated course information.

The processor may be used to implement a learning interface. For example, the processor may execute any number of software applications including a learning interface that is configured to access, interpret, and present a course and associated information to a learner, and to allow a learner to interact with the content and the learning system 620.

The learning station 610 may be provided with a number of software applications. The software may include a browser, such as, for example, NETSCAPE COMMUNICATOR®, MICROSOFT'S INTERNET EXPLORER®, or any other software application that may be used to interpret and process a markup language, such as HTML, SGML, DHTML®, XML, or XHTML. The browser also may include software plug-in applications that allow the browser to interpret, process, and present different types of information. The browser may include any number of application tools, such as, for example, JAVA®, ACTIVE X®, JAVASCRIPT® and FLASH®.

The communications interface may facilitate the exchange of data and information between the learning station 610 and the learning system 620. For example, the communications interface may be a communications card, a modem, a port, a wireless transceiver or a device that is able to transmit and receive data using the communications link 621. Data may be received from the learning system 620 and processed by the processor and/or stored in the storage. Similarly, data processed by the processor and/or stored in the storage may be transmitted to the learning system 620.

As described above, the learner may contact the learning system 620 using the learning station 610 to access a course. The learning interface and associated browser may be used to implement a graphical user interface that accepts information input from the learner and presents information received from the learning system 620. The learning interface also may be provided with a content player to present courses that are downloaded from the learning system 620 to the storage 760.

The Author Station

As shown in FIGS. 6 and 7 an e-learning system may also include an author station 630. The author station 630 may be implemented using a workstation, a computer, a portable computing device, or any intelligent device capable of executing instructions and connecting to a network. The author station 630 may include any number of devices and/or peripherals (e.g., displays, memory/storage devices, input devices, interfaces, printers, communication cards, and speakers) that facilitate access to, presentation of, and creation of courses and their associated content.

The author station 630 may execute any number of software applications including an author tool 740 that is configured to create, access, interpret, and present courses (and related course data/information). The author tool 740 may include a course editor 750 and a browser, such as, for example, NETSCAPE COMMUNICATOR®, MICROSOFT'S INTERNET EXPLORER®, or any other software application that may be used to interpret and process a markup language, such as HTML, SGML, DHTML®, or XML. The browser also may include software plug-in applications that allow the browser to interpret, process, create, and present different types of information. The browser may include any number of application tools, such as, for example, JAVA®, ACTIVE X®, JAVASCRIPT® and FLASH®.

The course author tool 740 may access content and associate the content with structural elements. The author tool 740 also may associate knowledge types, relations, and metadata with the structural elements. The author tool 740 may be used to build the structure of a course, i.e., its structural elements and relations. The author tool 740 may save the structural elements and metadata as course files and the associated content as media files.

The author station 630 also may include an embedded learning management system 760. The embedded learning management system 760 is an application program that is similar to the learning management system 623 and enables the author to preview a course by applying learning strategies to the course (e.g., that is being created/modified by the author) in order to view the navigation path that is suggested to a learner based on the applied strategy. Based on the different suggested navigation paths, the author may determine how to create structure for the course and how the created structure is interpreted by the learning management system 623. As a result, the author may edit, modify, or add structure to the course before publishing the course to the learning system 620.

The author station 630 also may include a communications interface 631. After a course is created, the author station 630 may use the communication interface 631 to connect to the learning system 620 to publish the course so that a learner may book and take the course. In particular, the communication interface of the author station 630 may connect to the content management system 625 using a communications link 635. To publish the course on the learning system 620, the author station 630 transfers the course structure and content (e.g., the course files and media files) to the content management system 625. As previously described, the course files may be formatted according to a markup language (e.g., XML). The communications link 635 may be implemented using any permanent or temporary communications link configured to transfer the course files and associated media files (e.g., a communications medium configured to transfer data signals as electrical, electromagnetic, or optical waves). The content management system 625 stores the course files and associated media files in the content repository for access by the content player 720.

The communication interface 631 of the author station 630 also may connect to the administration management system 627 using a communication link 637. The communication link may be implemented by any communication medium that may be configured to send and receive signals (e.g., electrical, electromagnetic, or optical). The author station 630 provides the administration management system 627 with course information (e.g., title, author, description, credits, prerequisites, and competencies gained/required) that is used by a learner, for example, to book a course. Once the course is published, the administration management system 627 makes the course information available to the learning station 610 using the learning portal.

The author tool 740 and author station 630 may include a course editor 750 that can be used in conjunction with a browser to create, modify, build, assemble, and preview course structures and their associated content. The course editor 750 may be used to structure content for use in a course. The course editor 750 includes a course editor interface. The course editor 750 may be used to create the structure for the course content. The structure may be saved as metadata. The metadata may be interpreted by the content player 720 of the learning management system 623 to present a course to a learner according to a learning strategy selected at run time. In particular, the course editor 750 enables the author to classify and describe structural elements, assign attributes to structural elements, assign relations between structural elements, and build a subject-taxonomic course structure. The course editor 750 primarily generates the structure of the course and not structure of the content (although structure of content may be provided for as well).

Collaborative E-learning

As previously described, conventional computer systems offer collaborative tools, such as, for example, chat rooms, email, online conferences, instant messages, message boards, and online black/whiteboards. Such systems are limited in or devoid of the use of a learner's context or a learner's current status in conjunction with the collaborative tools. However, the learning system 620 may be used to provide collaboration activities including points of collaboration to enhance a learner's experience based on the learner's context within a course and/or the learner's status within the e-learning system 620.

The points of collaboration may include generic, spontaneous, and intentional points of collaboration. A point of collaboration describes a cooperative activity between two or more users of the learning system 620. A point of collaboration is generic if it is not incorporated in a course the learner is actively taking. A point of collaboration is spontaneous if it is incorporated in a specific course, but is not associated with a particular point, a context, a structural element, or a status of the learner in the course. Therefore, spontaneous points of collaboration relate to a course as a whole and are not limited to specific content associated with the course.

An intentional point of collaboration allows two or more users (e.g., learners, tutors, and instructors) to participate in a cooperative activity (e.g., a collaboration scenario) that is logically and/or didactically associated with a course. The intentional point of collaboration may be associated with a specific context of a learner and/or a specific location in a course, as explained in detail below.

Each intentional point of collaboration may include one or more cooperative activities, such as collaboration scenarios. The collaboration scenarios guide the participants to a structured result and may be used for later evaluation of the participants. The scenarios may be executed if there are a sufficient number of participants to properly conduct the scenario; although, the learner is not prohibited or hindered from continuing in the course because there are insufficient numbers of participants available to conduct the scenario. In fact, the collaboration scenario does not have to be executed at a particular time or to complete the course. The collaboration scenarios are described in further detail below.

Cooperative activities, such as the collaboration scenarios, may be characterized by a goal, a collaboration process, participant information, and a dataflow. The goal may include development of knowledge, reflection on knowledge, application of knowledge, and transfer of knowledge. The goal may be attained after the intentional point of collaboration has been satisfactorily completed.

The collaboration process defines the way in which the goal is accomplished. The collaboration process may be used to structure the dialog, the actions, and/or the cooperative activities between participants of the collaboration. For example, the collaboration process may define the roles of the participants (e.g., a moderator, a proponent, a commentator, a tutor, an administrator, a judge, a juror, and a facilitator), the type of interaction (e.g., synchronous and asynchronous), the states of the process (and transitions between states), rules (what and when participants may do and how they may do it), and types of communicative contributions (e.g., reverberation, interaction, initiation, objective movement, meta operation, and social movement).

The collaboration process also may include a time of participation (e.g., the maximum and/or minimum duration of the process or a suggested length of the process). A collaboration tool may be provided to implement the collaboration process.

The participant information may define who may participate and/or is needed to perform the collaborative process. For example, the participants may be defined as having certain skills, competencies, knowledge, and/or attributes. The participants also may be determined based on a skill and/or competency that need to be acquired by a learner. The participant information also may define how many participants (e.g., a maximum and/or a minimum number of participants) are required for the collaborative process.

The dataflow may define how data is transferred within the cooperative activity. For example, the activity may include a number of data inputs and produce a number of outputs. Inputs may include task data and background knowledge needed or used in the collaborative activity. Outputs may include skills, competencies, and/or properties obtained by the learner from completing the cooperative activity. Outputs also may include a collaboration product (e.g., a document, a text, and a group determination or conclusion).

A course author may develop, create, and/or associate an intentional point of collaboration with a structural element of a course. In one implementation, the intentional point of collaboration is associated with or created as a knowledge 140 item. Using the authoring station 630, the course author may create a knowledge item 140 and designate the knowledge item 140 as an intentional point of collaboration. The course author may then create the intentional point of collaboration by determining a goal, a collaboration process, participant information, and a dataflow for the intentional point of collaboration.

In one implementation, collaboration templates (e.g., brainstorming, cooperative text, explanation discourse, pro/contra, and answer-to-tutor) may be used to describe the abstract collaboration scenarios motivated by an instructional theory. The template provides a readymade guide for the course author to create an intentional point of collaboration. The template also provides a built-in strategy for the progress of and the interaction between the participants. After selecting a template, the author may edit the template to provide an intentional point of collaboration that is customized for a specific course.

As described above, the course is composed of a number of structural elements. The basic or lowest level structural element of the course is the knowledge item 140. Once a knowledge item 140 is created, it is stored with the course material in the course repository. When a learner takes a course, the content player 720 provides a suggested path to the learner according to a selected learning strategy. The selected strategy may be used by the content player 720 to suggest to a learner when the knowledge item 140 (e.g., the cooperative activity) may be engaged in (e.g., to provide maximum benefit to the learner). However, the learner ultimately may determine when (and possibly whether) to participate in the cooperative activity. As described above, the learner is not required to immediately participate in a cooperative activity but may choose when it is appropriate (e.g., based on considerations, such as time and the availability of participants).

When a learner elects to explore a knowledge item 140 that is an intentional point of collaboration, the content player 720 informs the learner that the learner may participate in the intentional point of collaboration. The information provided to the learner may include the type of intentional point of collaboration, the topic, the number of required participants, and an estimation of time needed to take or complete the intentional point of collaboration. The content player 720 also adds the learner to a point of collaboration pool managed by the learning management system 623.

The point of collaboration pool includes a list of all the points of collaboration that are available for a learner to participate in. The point of collaboration pool is maintained by the learning management system 623. The learner may use the point of collaboration pool to determine information about the point of collaboration (e.g., type, topic, duration, and participants), to determine the state of a point of collaboration (running, ready, completed, or cancelled), and to determine if sufficient participants are available to establish the point of collaboration. The collaboration pool also may be used by the learner to view results of interaction with a point of collaboration. A point of collaboration stays in the point of collaboration pool until deleted (e.g., the point of collaboration is removed by the learner or other individual, such as a tutor, author, or instructor) or the system removes the point of collaboration (e.g., a time period after the course is completed by the learner).

If the learner elects to initiate a point of collaboration, the learning management system 623 determines whether there are enough participants to establish the point of collaboration. The learning management system 623 determines eligible participants from the learners who are online and have selected to initiate a point of collaboration (or are eligible to participate in the intentional point of collaboration). The learning management system 623 uses properties of the learners (e.g., from the learner account in administration system 627) when determining eligible participants for a group.

If there are not enough learners available at a given time, the learner may wait until enough learners are available. The learning management system 623 also may wait a predetermined amount of time before taking an alternative action to provide enough eligible participants (e.g., asking a online tutor to participate or asking a learner who has already completed the intentional point of collaboration to participate) in order to minimize the amount of time a learner who is ready to initiate an intentional point of collaboration has to wait.

If enough learners are online and have indicated they are ready to participate in the point of collaboration, the corresponding collaboration process and/or tool is launched and provided with any necessary information defined by the point of collaboration. In addition, all necessary connections with group members are established. The learner proceeds to interact in accordance with the format and tools established by the point of collaboration until the intentional point of collaboration is completed and/or the learners decide to stop. The learning management system 623 may record various user actions and results, which may be used to evaluate the learners. The recorded actions and results may be stored by the administration management system 627.

Once the learners are finished, the learning management system or an individual (e.g., a tutor, teacher, or course instructor/administrator) may evaluate each learner's performance and/or determine whether the intentional point of collaboration has been successfully completed. In addition, the learner, peer learners, or a learning group also may complete an evaluation. The evaluation may determine that the learner has gained certain skills and/or competencies as a result of the completing the intentional point of collaboration. Any gained experience, skills, and/or competencies may be stored in the learner account of the administration management system 627.

A learner also may gain or be assigned one or more collaboration properties by the learning management system 623. The collaboration property may be used to describe the behavior or manner in which the learner has interacted with the intentional point of collaboration. For example, if an intentional point of collaboration includes one or more roles, the collaboration property may record which role (e.g., a moderator in a group discussion) the learner has performed and the number of times the learner has performed the role.

A collaboration property is different than a competency. For example, the fact that a learner has performed the role of moderator does not necessarily mean that the learner is a competent moderator. The collaboration property may be used by the learning management system 623 in the formation of intentional points of collaboration (e.g., to assign a role to a learner that the learner has performed). The collaboration properties also may be stored in a collaboration history (e.g., in the learner account of the administration system 627) and used to evaluate the learner or for administration/planning purposes.

Learning Templates

As described above, the author of a course may choose from one or more readymade templates to facilitate the creation of an intentional point of collaboration. Some examples of collaboration templates include a brainstorming activity, a cooperative text processing activity, an explanation discourse activity, an answer-to-tutor activity, and a pro-contra dispute. The templates may include a number of parameters (a type, a min/max number of learners, content/documents/material, tools, and other parameters specific to the template) that are defined by the course author when creating the intentional point of collaboration. Each of the templates is described in further detail below.

The goal pro/contra template is to allow two or more participants to debate and defend a critical position for an assigned topic. According to the underlying learning process each participant is assigned the role of proponent (arguing in favor of a position) or the opponent (arguing against or challenging a position). A collaboration tool (e.g., and enhanced chat tool) indicates which role is assigned to each participant, which participant has the right to speak, and controls time constraints for each speaker. A tutor may moderate, comment on, or evaluate the exchange between participants.

The goal of the brainstorming template is to structure a knowledge area. The underlying learning process defines phases of individual and collaborative generation of ideas and a phase of collaborative structuring of the collected ideas. Typically a brainstorming group may have two to ten participants. A collaboration tool such as chat, audio/video conferencing, whiteboard, and/or a specific brainstorming collaboration tool is specified and/or provided. The collaboration tool provides the learners with instructions, a topic, and/or seed words to begin the intentional point of collaboration. The collaboration tool grants the right of free speech to each participant. Each participant has the same role, and the interaction of each participant is synchronous.

The goal of the cooperative text processing template is acquisition of new knowledge. As input, a text consisting of a sequence of sections is provided. The learning process defines a process to proceed through the text section by section. For each section, one participant is given the role of summarizer and the other participants are assigned the role of commentators. All participants read the section. The summarizer produces a summary, which is then commented on by the other participants. The interaction type is synchronous.

The goal of the explanation discourse template is to reflect on and deepen previously acquired knowledge. A chat tool and/or audio/video conferencing tool may be provided. An initial explanation, instructions, and/or topic are presented by a collaboration tool. Participating learners can request a tutor for the right to speak. The learners and the tutor each select a type of contribution (e.g., an explanation, a question, or a comment). This interaction type is synchronous.

The goal of the answer to tutor template is to apply and evaluate knowledge. According to the learning protocol, a tutor may present a question that is answered by a learner. This interaction type is asynchronous. The tutor may comment on and/or evaluate the learner's answer and further discussion may occur between the tutor and the learner. A chat tool and/or audio/video conferencing tool may be provided.

The course author also may create an intentional point of collaboration using the course editor 750 provided by the course author station 631. Using the course editor 750, the author may create a knowledge item and specify the knowledge item to be an intentional point of collaboration. The intentional point of collaboration may be created using the course editor 750 by specifying a goal, a collaboration process, participants, and a dataflow. The author also may specify any collaborative tools used or supported by the intentional point of collaboration. The intentional point of collaboration also may be created by importing a knowledge item from another course (e.g., including an intentional point of collaboration). The course author also may specify any competencies, skills, and/or collaborative properties that are gained by successfully completing or by interacting with the intentional point of collaboration.

A course author also may create an intentional point of collaboration by selecting a template (e.g., pro/contra dispute, brainstorming, cooperative text, explanation discourse, and answer-to-tutor) using the course author station 631 and editor 750. The template provides the author with inputs for the selected template to define the collaborative activity. The author may input and associate any required learning material with the template. The course author may create a knowledge item 140 and associate the template with the knowledge item 140 when creating or editing the course.

User Interface

Figure 8:
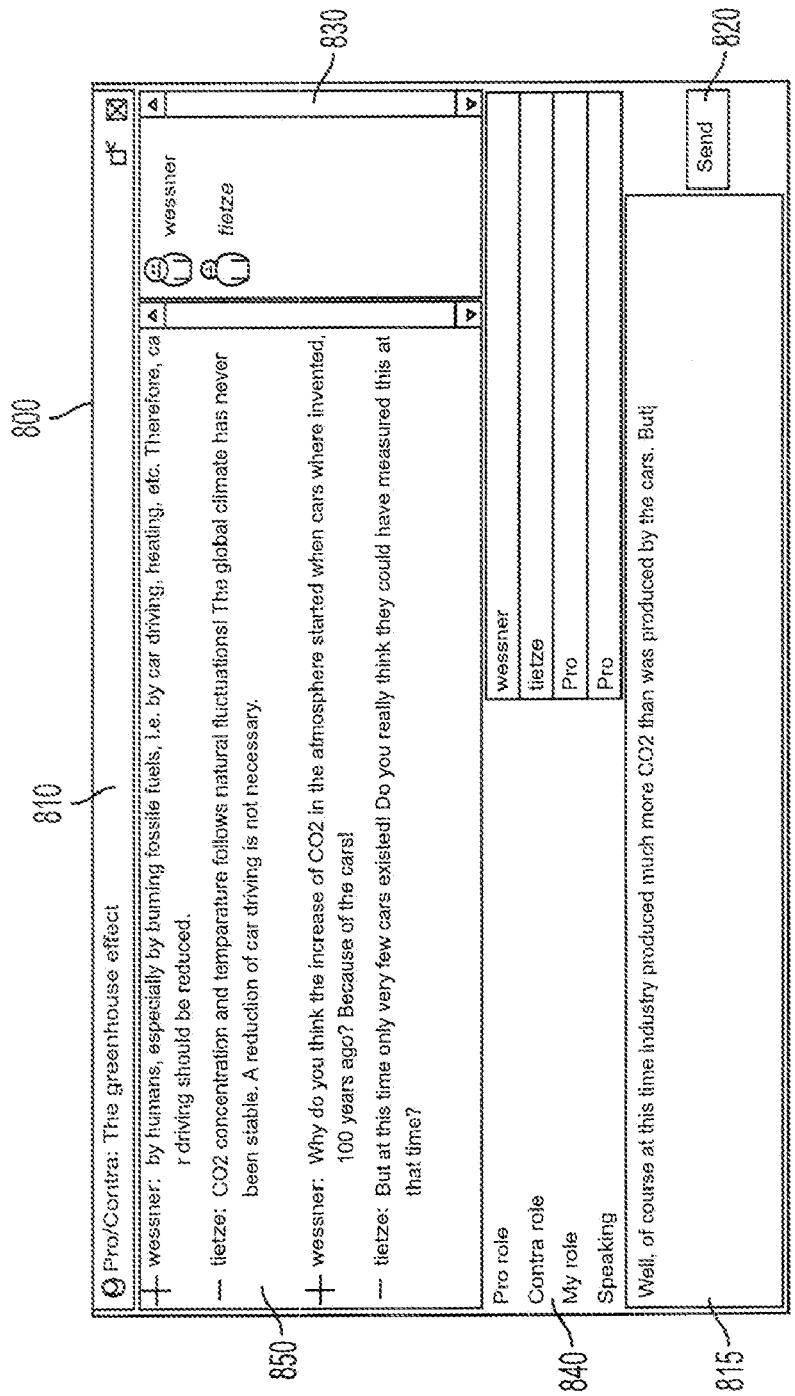
FIG. 8 is an example of a collaboration user interface for use with the systems of FIGS. 6 and 7.

The learning user interface provided by the learning station 610 for an intentional point of collaboration depends on the collaborative tool used to carry out the collaborative activity. Many of the intentional points of collaboration use a modified or enhanced chat tool. The collaboration tool provides a user interface to implement the process to carry out the collaborative activity between the collaboration participants. For example, the collaboration tool may provide an enhanced chat interface that provides a display 800 including one or more windows as shown in FIG. 8.

The display 800 may include a title bar 810 to identify the type of intentional point of collaboration and the particular intentional point of collaboration in which the learner is participating. In one implementation, the interface may include an input portion or window 815, where text is input by the learner. The text may be input using a user input device of the learning station 610 and edited in the window 815. When the learner is ready to participate, an input 820 (e.g., a virtual send button) may be selected. The input text is then displayed in a dialog window 850 that displays a running commentary of the dialog between the collaboration participants. The input text may be associated with an identifier and role of each participant.

A participant list 830 may be shown. The list 830 may include an identifier for each participant and a role of each participant. An information area 840 may include information about the collaboration, such as roles of each participant, the role of the participant using the window 800, and the participant currently speaking. In another implementation, the participant list may be included or combined with other window or areas (e.g., information area 840 may include or be combined with the participation list 830).

Various timers also may be displayed (e.g., a duration, a time remaining, and a time per speaker).

Other windows may be provided to display learning material, a group text, video, and images, to be used in the collaborative activity.

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A method performed in an electronic learning system, the method comprising:
   organizing content associated with an electronic course into two or more structural elements, at least one of the structural elements comprising a collaboration element that defines a collaboration activity;
   the collaboration activity including (i) a collaboration process that defines a way to accomplish a goal associated with the electronic course, (ii) participant information that defines who may participate in the collaboration process, and (iii) dataflow information that defines how data is to be transferred in the collaboration process;
   storing, separate from the structural elements, a collaboration pool identifying points of collaboration defined in structural elements of the electronic course, including a point of collaboration corresponding to the collaboration activity, the collaboration pool comprising, for the collaboration activity: information including a type of collaboration, a state of collaboration, and availability of participants for the collaboration;
   aggregating the structural elements into two or more levels, where a higher level structural element refers to a lower level structural element; and
   assembling the structural elements into the electronic course.

2. The method system of claim 1, further comprising receiving a selection to participate in the collaboration process while taking the electronic course.

3. The method of claim 1, wherein the collaboration activity comprises one of a brainstorming activity, a cooperative text processing activity, an explanation discourse activity, an answer-to-tutor activity, and a pro-contra dispute.

4. The method of claim 3, wherein the collaboration activity is configured to be implemented between two or more learners.

5. The method of claim 1, wherein a structural element comprising the collaboration element comprises a knowledge item.

6. The method of claim 5, wherein the structural elements do not enforce a sequence of content or collaboration elements used to traverse the electronic course.

7. The method of claim 5, further comprising associating metadata with the structural elements.

8. The method of claim 1, further comprising associating a competency with the collaboration element.

9. The method of claim 8, further comprising determining how to present course material using the competency.

10. The method of claim 1, further comprising associating a collaboration property with the collaboration element.

11. The method of claim 1, further comprising associated one or more intentional points of collaboration with the collaboration activity.

12. The method of claim 1, further comprising:
    storing a collaboration property for a learner, the collaboration property corresponding to a role previously performed by the learner in a previous point of collaboration; and
    using the collaboration property to assign the role to the learner in a subsequent point of collaboration.

13. A machine-readable medium for storing course data for access by an application program, the course data comprising:
    a course data structure comprising information for use by the application program to present an electronic course, the course data structure comprising:
       structural elements aggregated into two or more levels, where a higher level structural element refers to a lower level structural element, at least one of the structural elements comprising a collaboration element that defines a collaboration activity;
          the collaboration activity including (i) a collaboration process that defines, a way to accomplish a goal associated with the electronic course, (ii) participant information that defines who may participate in the collaboration process, and (iii) dataflow information that defines how data is to be transferred in the collaboration process;
       metadata to describe the structural elements; and
       relations to indicate dependencies between the structural elements; and
    a collaboration pool, that is separate from the structural elements, for identifying points of collaboration defined in structural elements of the electronic course, including a point of collaboration corresponding to the collaboration activity, the collaboration pool comprising, for the collaboration activity: information including a type of collaboration, a state of collaboration, and availability of participants for the collaboration.

14. The machine-readable medium of claim 13, wherein the collaboration activity comprises an intentional point of collaboration.

15. The machine-readable medium of claim 13, wherein the collaboration activity comprises one of a brainstorming activity, a cooperative text processing activity, an explanation discourse activity, an answer-to-tutor activity, and a pro-contra dispute.

16. The machine-readable medium of claim 1, wherein the collaboration activity is configured to be performed by two or more learners.

17. The machine-readable medium of claim 13, wherein the at least one structural element comprises a knowledge item.

18. The machine-readable medium of claim 13, wherein the structural elements do not enforce a sequence of content or collaboration elements to traverse the electronic course.

19. The machine-readable medium of claim 13, wherein a competency is associated with the collaboration element.

20. The machine-readable medium of claim 19, wherein the competency may be used to determine how to present course material from the electronic course.

21. The machine-readable medium of claim 13, wherein a collaboration property is associated with the collaboration element.

22. The machine-readable medium of claim 13, further comprising instructions to, store a collaboration property for a learner, the collaboration property corresponding to a role previously performed by the learner in a previous point of collaboration; and use the collaboration property to assign the role to the learner in a subsequent point of collaboration.

* * * * *